United States Patent Office 3,090,729
Patented May 21, 1963

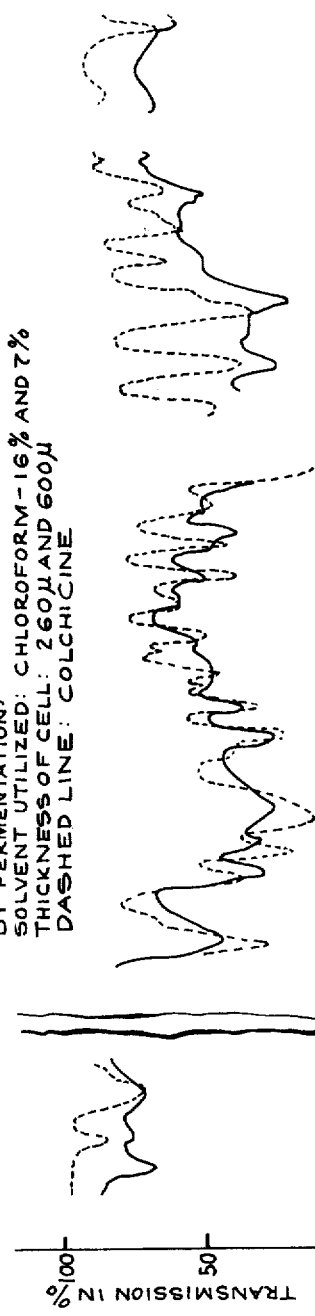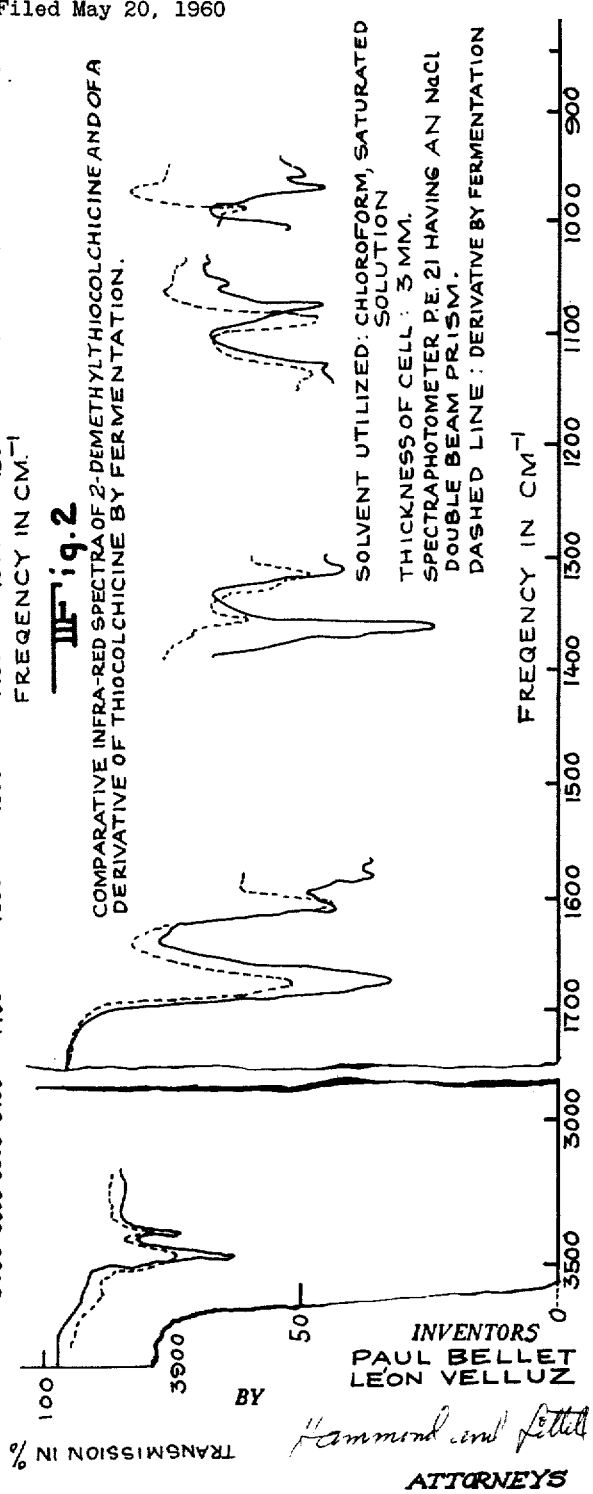

3,090,729
NOVEL COLCHICINE DERIVATIVES AND
PROCESS FOR THEIR PRODUCTION
Paul Bellet and Leon Velluz, Paris, France, assignors to Roussel-UCLAF, Societe Anonyme, Paris, France, a corporation of France
Filed May 20, 1960, Ser. No. 30,684
Claims priority, application France May 22, 1959
9 Claims. (Cl. 195—51)

The present invention relates to novel colchicine derivatives and the process for their production. It relates more particularly to the transformation products obtained by the action of fungi (from molds, bacteria, yeast, actinomycetic cultures, etc.) on the diverse substances extracted from colchicum seed, on the thio-analogs of these substances as well as on the diverse products of chemical transformation of colchicines, colchiceines, thiocolchicines and thiocolchiceines.

The invention also relates to a general process for the transformation of substances of the colchicine and thiocolchicine family by means of microbiological fermentation.

The known derivatives of colchicine are useful antimitotic agents. However, when used as such, they suffer the drawback that they are also quite toxic and the therapeutic index or safety factor is low.

It is an object of this invention to develop a derivative of colchicine having an antimitotic action comparable with the known colchicine derivatives with a greatly improved therapeutic index.

Another object of this invention is the obtention of novel colchicine derivatives by the transformation by action of fungi on known colchicine derivatives.

A further object of this invention is the development of a process for the preparation of novel colchicine derivatives having good antimitotic activity and a high therapeutic index by subjecting known colchicine derivatives to the action of fungi such as *Streptomyces griseus* and separating and recovering the novel colchicine derivatives.

A still further object of this invention is the development of a method of stopping mitosis in cells by subjecting them to the action of a sub-lethal dose of novel colchicine derivatives derived from known colchicine derivatives by the action of fungi.

These and other objects of the invention will become more apparent as the description thereof proceeds.

The novel substances obtained by the process of the invention are characterized by a notable improvement of the pharmacodynamic action, compared to that of the starting material. The antimitotic action of the novel products is accentuated and the toxicity reduced, thus permitting their industrial use in agriculture for the modification of mitosis and for the creation of polyploids. This industrial use can be effected by distribution of aqueous solutions or suspensions of products on the cultivated soil, or by preliminary treatment of seeds with the novel products in pure form or diluted in a solvent or on a carrier.

FIG. 1 shows the comparative infra-red spectra of colchicine and of a derivative of colchicine by fermentation.

FIG. 2 shows the comparative infra-red spectra of 2-demethylthiocolchicine and of a derivative of thiocolchicine by fermentation.

It is known that certain microorganisms are capable of causing varied changes on the molecules of certain well known chemical substances. Thus, in the steroid series, many processes have been devised which lead to the introduction of hydroxyl groups or also to the creation of double bonds. No such microbiological changes have ever been observed in the colchicinic series. The process of the present invention allows, for the first time, access, by unforeseen means, to novel compounds of great interest, the preparation of which seemed impossible until this time. Since chemical synthesis of the colchicines has not yet been accomplished, the molecular modifications of substances of this family are still very limited.

According to the process of the invention, a well-developed culture of a microorganism belonging to the fungi group (see G. Smith: Industrial Mycology) is prepared by known methods and a colchicine or a thiocolchicine derivative is added. The incubation is allowed to proceed (the evolution of the reaction can be followed by means of the paper chromatography method) and the novel derivative is isolated by extraction with the aid of an appropriate solvent, which is not miscible with water, final chromatography and crystallization. As starting materials it is possible to mention colchicine, colchiceine; colchicoside; the substances C (2-demethylcolchicine) and F (N-methyldesacetylcolchicine) of Santavy; the tropaminones; the corresponding thioderivatives of the above; the thiocolchicine-sulfoxides; and the corresponding N-desacetylated, N-alkylated and N-acylated derivatives of the above. A great number of the said starting materials have the following general formula:

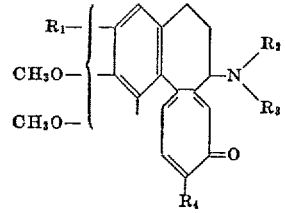

wherein $R_1$=H, —OH, -O-acyl, O-alkyl, O-aralkyl, O-heterosyl
$R_2$=H, alkyl
$R_3$=H, acyl, alkyl, heterosyl
$R_4$=-O-alkyl, -S-alkyl,

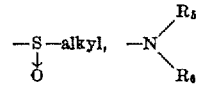

(where $R_5$ and $R_6$ are hydrogen or an alkyl or hydroxyalkyl group).

The michoorganism used is selected from the classes of fungi (Streptomyces, molds, bacteria and yeast). The well developed culture is aged for 30 to 72 hours and its pH is adjusted to between 3 and 8. The subsequent incubation after addition of the starting colchicine derivative is allowed to proceed for 24 to 90 hours.

In a variant of the process described above, it is possible to prepare, according to known processes, a well developed culture of a microorganism, filter the mycelium and suspend the latter in an aqueous buffer having a pH of 5 to 8. Colchicine or thiocolchicine is added thereto and the remainder of the operations are continued as described above.

A series of microorganisms have been tested and found to be capable of effecting the molecular transformations, which are the object of the present invention. Among these microorganisms, it is possible to mention as examples:

| | ATCC No. |
|---|---|
| Saccharomyces ellipsoideus | 4097 |
| Streptomyces griseus | 10137 |
| Fusarium roseum | 10914 |
| Fusarium oxyporum | 7601 |
| Fusarium javanicum | 12575 |
| Fusarium gladioli | 11137 |
| Fusarium solani | 11712 |
| Curvularia lunata | 12017 |
| Corynebacterium simplex | 6946 |
| Cunninghamella blakesleeana | 8688 |
| Aspergillus niger | 10548 |
| Streptococcus sp. | |

The following examples illustrate the invention without, however, limiting it.

EXAMPLE I

*Production of a Novel Tropolonic Substance by Microbiological Action on Colchicine*

850 mgm. of colchicine are introduced into 4 liters of a 48 hour old culture of *Streptomyces griseus* (ATCC 10137). The mixture is allowed to incubate for 48 hours at room temperature and is then extracted five times with 400 cc. aliquots of chloroform, the extracts are combined, dried over magnesium sulfate and evaporated to dryness in vacuo. The residue is taken up in 100 cc. of a mixture of chloroform and ether (1:2) and subjected to chromatography through a column containing 100 gm. of alumina according to Brockmann. The untransformed colchicine is eluted by a mixture of chloroform and ether (1:2) whereas the transformation product, more strongly retained on the column, is eluted in turn by the mixture of chloroform and methanol (99:1).

The eluted transformation fractions are combined and evaporated to dryness in vacuo. The residue is taken up in a mixture of chloroform and ether (1:2) and crystallized. 160 mgm. of small yellow hexagonal crystals having a melting point of 176–178° C. (melting slowly in the tube), and a specific rotation $[\alpha]_D^{25} = -196° \pm 2$ (c.=1% in methanol), are obtained.

The novel product is soluble in water, alcohol, acetone and chloroform. It is insoluble in ether and in benzene. The chloroform-ether (1:2) elutions quantitatively produce the starting colchicine, which molecule has not been modified.

The novel substance obtained according to the present example exhibits the following characteristics:

$\lambda$ max.=237.5 m$\mu$ (log $\epsilon$=4.47)
$\lambda$ max.=353 m$\mu$ (log $\epsilon$=4.20)

The infra-red spectrum shows evidence of a free hydroxyl group; it differentiates the novel substance from other known colchicines. FIG. 1 of the drawing shows an infrared spectra of this compound in comparison with the starting colchicine.

*Analysis.*—Found: C, 55.7%; H, 5.1%; Cl, 16.20%; N, 2.8%; OMe, 20.5%.

These analytical values correspond to a mono demethylated colchicine having the empirical formula $C_{21}H_{23}O_6N$, for a solvated product comprising 0.7 molecules of chloroform of crystallization.

EXAMPLE II

*Antimitotic Action of the Novel Tropolonic Substance Obtained by Microbiological Action on Colchicine*

A 1°/$_{oo}$ aqueous solution of the novel substance is obtained according to the preceding example, then on dilution a 0.2°/$_{oo}$ and a 0.05°/$_{oo}$ solution are prepared. 5 to 10 lentil seeds, which were previously soaked in water for about 15 hours, are immersed in each of the above three solutions of different concentrations for three hours. The seeds are then placed in a cellulose pad impregnated with water and left to germinate at 20–24° C. for four days. The sprouts are then compared with those of the untreated control seeds or with those of control seeds treated with similar concentrations of colchicine solutions. The differences in length of the development of the sprouts and rootlets is due to the antimitotic action of the novel substance. The results of this test are shown on the table below:

| | Germinated Seeds | Percent Germination | Length of Sprouts in mm. | Length of roots in mm. | Tuberisation |
|---|---|---|---|---|---|
| Pure Water (Control) | 9/10 | 90 | 40 | 60 | None |
| Colchicine at 1°/$_{oo}$ | 8/8 | 100 | 5 | 7 | +++ |
| Novel Substance at 1°/$_{oo}$ | 8/8 | 100 | 5 | 9 | +++ |
| Colchicine at 0.2°/$_{oo}$ | 8/8 | 100 | 4 to 5 | 7 | +++ |
| Novel substance at 0.2°/$_{oo}$ | 8/8 | 100 | 5 to 12 | 8 | ++ |

The antimitotic action is thus substantially equal to that of colchicine.

EXAMPLE III

*Production of a Novel Tropolonic Substance by Microbiological Action on Thiocolchicine*

920 mgm. of thiocolchicine are introduced into 3.7 liters of a culture of 48 hour old *Streptomyces griseus* (ATCC 10137). The mixture is left to incubate for 48 hours at room temperature and is then extracted five times with 300 cc. aliquots of chloroform. The extracts are combined, washed with water and re-extracted four times with 100 cc. aliquots of 0.1 N sodium hydroxide. The aqueous sodium hydroxide liquors are combined, acidified with hydrochloric acid and extracted four times with 25 cc. aliquots of chloroform.

The chloroform solutions are combined, dried over magnesium sulfate and evaporated to dryness in vacuo. The residue is dissolved in a mixture of chloroform and ether (1:1) and rapidly passed through a column containing 10 gm. of alumina according to Brockmann. The column is eluted with chloroform. The chloroform-ether and chloroform solutions are combined and evaporated to dryness in vacuo. The residue is crystallized from benzene to obtain 175 mgm. of small yellow diamond-shaped crystals which are insoluble in ether, slightly soluble in acetone, benzene and water, and soluble in methanol, ethanol, chloroform and alkaline liquors. The crystals have a melting point of 182–184° C. (melting slowly in the tube) and a specific rotation $[\alpha]_D^{20} = -281° \pm 2$ (c.=0.5% in methanol).

The novel substance obtained according to the present example exhibits the following characteristics.

ULTRA-VIOLET SPECTRUM (1) In ethanol:
$\lambda$ max.=257–258 m$\mu$, $\epsilon$=20,400, log $\epsilon$=4.30
$\lambda$ max.=290–292 m$\mu$, $\epsilon$=10,150, log $\epsilon$=4.00
$\lambda$ max.=385 m$\mu$, $\epsilon$=16,320, log $\epsilon$=4.20

(2) In sodium hydroxide solution:
$\lambda$ max.=254 m$\mu$, $\epsilon$=27,100, log $\epsilon$=4.43
$\lambda$ max.=287 m$\mu$, $\epsilon$=15,060, log $\epsilon$=4.17
$\lambda$ max.=375 m$\mu$, $\epsilon$=15,650, log $\epsilon$=4.19

*Analysis.*—Found: C, 64.1%; H, 5.9%; N, 3.3%; S, 7.5%; OMe, 15.0%.

These analytical values correspond to a mono demethylated thiocolchicine having the empirical formula $C_{21}H_{23}O_5NS$, for a solvated product containing 0.25 molecule of benzene of crystallization.

FIG. 2 shows an infra-red spectra of this compound (dashed line in comparison with 2-demethylthiocolchicine.

Subjected to the test described in Example II, on lentil seeds, this novel product obtained from thiocolchicine shows an excellent antimitotic activity.

EXAMPLE IV

*Determination of the Therapeutic Indices of the Novel Substances Obtained by Microbiological Action on Colchicine and Thiocolchicine*

The novel substances obtained according to Examples I and III, are subjected to tests for acute toxicity by intraperitoneal administration in mice and for antimitotic action according to the technique described by R. Jequier, D. Branceni and M. Peterfalvi, Archives Internationales de Pharmacodynamie et de therapie, 103, 243 (1955), in rats. The $DL_{50}$ (the lethal dose in 50% of the treated animals) and the $DAM_{100}$ (antimitotic dose: cells in mitosis/total number of cells), are determined, then the therapeutic index ($DL_{50}$ divided by $DAM_{100}$) is determined, and the results obtained are compared with those of N-desacetyl-thiocolchicine, which is the colchicine derivative with the best known therapeutic index until now. The resutls are shown on the following table:

| Products | $DL_{50}$, mg./kg. | $DAM_{100}$, mg./kg. | Therapeutic Index |
|---|---|---|---|
| Colchicine | 2 | 0.7 | 3 |
| N-desacetyl-thiocolchicine | 210 | 10 | 21 |
| Novel Substance of Example I | 200 | 5 | 40 |
| Novel Substance of Example III | 120 | 5 | 24 |

The products of the invention show therapeutic indices which have been unequalled heretofore.

EXAMPLE V

*Production of a Well-Developed Culture of Streptomyces Griseus (ATCC 10137)*

A culture medium composed as follows is prepared:

| | Gm. |
|---|---|
| Glucose | 10 |
| Corn steep liquor | 10 |
| Soy bean flour | 10 |
| Dry malt extract | 5 |
| Calcium carbonate | 1 |
| Sodium chloride | 5 |
| Water to make 1000 cc. | |

It is sterilized at 115° C. for 20 minutes, cooled to 25° C., inoculated with spores harvested from agar slant and incubated at 25° C. for 48 hours.

The above examples are not limitative of the invention. It is possible to work with other indicated microorganisms or also to use as starting materials other indicated colchicines or thiocolchicines The use of equivalent techniques known to those skilled in the art is readily apparent and not excluded from the spirit of the invention. The scope of the invention is to be construed by the appended claims.

We claim:

1. A process for the production of a demethylated derivative of a colchicine derivative which comprises the steps of preparing an aqueous culture of a fungal microorganism selected from the group consisting of Streptomyces, Fusarium, Curvularia, Corynebacterium, Cunninghamella, Aspergillus and Streptococcus, incubating the same until a vigorous growth occurs, adding to said growing culture a colchicine derivative of the formula:

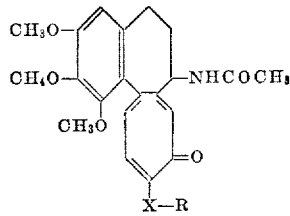

wherein X is selected from the group consisting of sulfur and oxygen and R represents a lower alkyl, incubating the culture for a time sufficient to effect transformation of said colchicine derivative and recovering said transformed demethylated derivative of said colchicine derivative free from said starting colchicine derivative.

2. The process of claim 1 wherein said growing culture is incubated for about 30 to about 72 hours while maintaining its pH between about 3 and about 8 before the addition of said starting colchicine derivative 3. The process of claim 1 wherein said incubation to effect transformation of the colchicine derivative is carried out for about 24 to about 90 hours.

4. A process for the production of a derivative of the colchicine series having an antimitotic effect similar to the starting colchicine derivative which comprises the steps of preparing an aqueous culture of *Streptomyces griseus*, incubating the same for about 30 to about 72 hours while maintaining the pH between about 3 and about 8, adding to said incubated culture a starting material selected from the group consisting of colchicine and thiocolchicine, incubating the culture for a period of about 24 to about 90 hours to effect transformation of said starting material, extracting said culture with an inert organic solvent immiscible in water, separating said untransformed starting material and recovering said transformed derivative of the colchicine series having an antimitotic effect similar to said starting material.

5. A process for the production of a derivative of the colchicine series having an antimitotic effect similar to colchicine which comprises the steps of preparing an aqueous culture of *Streptomyces griseus*, incubating the same for about 30 to about 82 hours while maintaining the pH between about 3 and about 8, adding colchicine to said incubated culture, incubating the culture for a period of about 24 to about 90 hours to effect transformation of said colchicine, extracting said culture with an inert organic solvent immiscible in water, separating said untransformed colchicine by chromatography and recovering said transformed derivative of colchicine having an antimitotic effect equal to colchicine.

6. A process for the production of a transformed product of the colchicine series having the empirical formula $C_{21}H_{23}O_6N$, an ultraviolet spectrum of:

$\lambda$ max.=237.5 m$\mu$ (log $\epsilon$=4.47)
$\lambda$ max.=353 m$\mu$ (log $\epsilon$=4.20)

an infra-red spectrum showing evidence of a free hydroxyl group, a melting point of 176–178° C., a specific rotation of $[\alpha]_D^{25} = -196° \pm 2$ (c.=1% in methanol), in the form of small yellow hexagonal crystals soluble in water, ethyl alcohol, acetone and chloroform, and insoluble in ether and benzene, and having an antimitotic action substantially equal to that of colchicine and a therapeutic index approximately 13 times greater than colchicine, which comprises the steps of preparing an aqueous culture of *Streptomyces griseus*, incubating the same for about 30 to about 72 hours while maintaining the pH between about 3 and about 8, adding colchicine to said incubated culture, incubating the culture for a period of about 24 to about 90 hours to effect transformation of said colchicine, extracting said culture with an inert organic solvent immiscible in water, separating said untransformed colchicine by chromatography and recovering said transformed derivative of colchicine.

7. A process for the production of a derivative of the colchicine series having an antimitotic effect similar to thiocolchicine which comprises the steps of preparing an aqueous culture of *Streptomyces griseus*, incubating the same for about 30 to about 72 hours while maintaining the pH between about 3 and about 8, adding thiocolchicine to said incubated culture, incubating the culture for a period of about 24 to about 90 hours to effect transformation of said thiocolchicine, extracting said culture with an inert organic solvent immiscible in water, separating said untransformed thiocolchicine by chromatography and recovering said transformed derivative of thiocolchicine having an antimitotic effect equal to thiocolchicine.

8. A process for the production of a product of the colchicine series having an empirical formula $C_{21}H_{23}O_5NS$, an ultraviolet spectrum of:

$\lambda$ max. 257–258 m$\mu$, $\epsilon$=20,400, log $\epsilon$=4.30 (ethanol)
$\lambda$ max. 290–292 m$\mu$, $\epsilon$=10,150, log $\epsilon$=4.00 (ethanol)
$\lambda$ max. 385 m$\mu$, $\epsilon$=16,320, log $\epsilon$=4.20 (ethanol)
$\lambda$ max. 254 m$\mu$, $\epsilon$=27,100, log $\epsilon$=4.43 (sodium hydroxide solution)
$\lambda$ max. 287 m$\mu$, $\epsilon$=15,060, log $\epsilon$=4.17 (sodium hydroxide solution)
$\lambda$ max. 375 m$\mu$, $\epsilon$=15,650, log $\epsilon$=4.19 (sodium hydroxide solution)

a melting point of 182–184° C., a specific rotation of $[\alpha]_D^{25}$=−281°±2 (c.=0.5% in methanol), occurring in the form of small yellow diamond-shaped crystals soluble in methanol, ethanol, chloroform and aqueous alkaline solutions, slightly soluble in acetone, benzene and water, and insoluble in ether, having an antimitotic action substantially equal to that of colchicine and a therapeutic index approximately 8 times greater than colchicine, which comprises the steps of preparing an aqueous culture of Streptomyces griseus, incubating the same for about 30 to about 72 hours while maintaining the pH between about 3 and about 8, adding thiocolchicine to said incubated culture, incubating the culture for a period of about 24 to about 90 hours to effect transformation of said thiocolchicine, extracting said culture with an inert organic solvent immiscible in water, separating said untransformed thiocolchicine by chromatography and recovering said transformed derivative of thiocolchicine.

9. Process for the production of a demethylated derivative of a colchicine derivative which comprises the steps of preparing an aqueous culture of a fungal microorganism selected from the group consisting of Streptomyces, Fusarium, Curvularia, Corynebacterium, Cunninghamella, Aspergillus and Streptococcus, incubating the same until vigorous growth occurs, filtering said culture and separating the mycelium produced, suspending said mycelium in an aqueous buffered solution at a pH of about 5 to about 8, adding to said suspension a colchicine derivative of the formula:

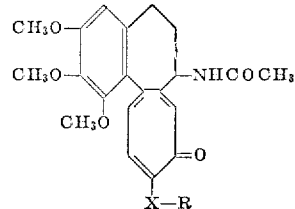

wherein X is selected from the group consisting of sulfur and oxygen and R represents a lower alkyl, incubating the culture for a time sufficient to effect transformation of said colchicine derivative, and recovering said transformed demethylated derivative of said colchicine derivative free from said starting colchicine derivative.

References Cited in the file of this patent

UNITED STATES PATENTS

| | | |
|---|---|---|
| 2,691,011 | Perlman et al. | Oct. 5, 1954 |
| 2,753,290 | Fried et al. | July 3, 1956 |
| 2,776,963 | Stoll et al. | Jan. 8, 1957 |
| 2,816,059 | Mills | Dec. 10, 1957 |
| 2,843,523 | Freedman et al. | July 15, 1958 |
| 2,855,343 | Fried et al. | Oct. 7, 1958 |
| 2,864,679 | Hamm et al. | Dec. 16, 1958 |
| 2,882,140 | Searle | Apr. 14, 1959 |

UNITED STATES PATENT OFFICE
CERTIFICATE OF CORRECTION

Patent No. 3,090,729                                    May 21, 1963

Paul Bellet et al.

It is hereby certified that error appears in the above numbered patent requiring correction and that the said Letters Patent should read as corrected below.

Column 3, line 10, for "oxyporum" read -- oxysporum --; column 4, line 73, after "line" insert a closing parenthesis; column 6, line 33, for "82 hours" read -- 72 hours --.

Signed and sealed this 3rd day of December 1963.

(SEAL)
Attest:
ERNEST W. SWIDER

Attesting Officer

EDWIN L. REYNOLDS

Acting Commissioner of Patents